US012688977B2

(12) United States Patent
Kuranuki et al.

(10) Patent No.: US 12,688,977 B2
(45) Date of Patent: Jul. 21, 2026

(54) SOLID ELECTROLYTIC CAPACITOR

(71) Applicant: Panasonic Intellectual Property Management Co., Ltd., Osaka (JP)

(72) Inventors: Kenji Kuranuki, Kyoto Fu (JP); Saori Ueda, Osaka Fu (JP); Junichi Kurita, Osaka Fu (JP); Masaya Kiso, Hyogo Ken (JP); Daisuke Kubo, Osaka Fu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 145 days.

(21) Appl. No.: 18/891,472

(22) Filed: Sep. 20, 2024

(65) Prior Publication Data

US 2025/0014838 A1 Jan. 9, 2025

Related U.S. Application Data

(63) Continuation of application No. PCT/JP2023/005889, filed on Feb. 20, 2023.

(30) Foreign Application Priority Data

Mar. 24, 2022 (JP) ................................. 2022-048601

(51) Int. Cl.
H01G 9/15 (2006.01)
H01G 9/00 (2006.01)
(Continued)

(52) U.S. Cl.
CPC ............. H01G 9/15 (2013.01); H01G 9/0029 (2013.01); H01G 9/012 (2013.01);
(Continued)

(58) Field of Classification Search
CPC ...... H01G 9/012; H01G 9/0425; H01G 9/048; H01G 9/055; H01G 9/15
See application file for complete search history.

(56) References Cited

U.S. PATENT DOCUMENTS

| | | | | |
|---|---|---|---|---|
| 2006/0056136 A1* | 3/2006 | Fujii | ...................... | H01G 9/042 |
| | | | | 361/540 |
| 2009/0080144 A1* | 3/2009 | Matumoto | ............. | H01G 11/48 |
| | | | | 29/25.03 |

(Continued)

FOREIGN PATENT DOCUMENTS

| | | | | |
|---|---|---|---|---|
| CN | 115274306 B | * | 11/2025 | .......... H01G 13/003 |
| JP | 2005-236171 A | | 9/2005 | |

(Continued)

OTHER PUBLICATIONS

English Translation of International Preliminary Report on Patentability Chapter I for PCT/JP2023/005889 issued Sep. 24, 2024, (Year: 2024).*

(Continued)

*Primary Examiner* — Nathan Milakovich
(74) *Attorney, Agent, or Firm* — Rimon P.C.

(57) ABSTRACT

A disclosed solid electrolytic capacitor includes: a stacked unit constituted by a stack of a plurality of capacitor units each having a capacitor element including an anode portion and a cathode portion, and a cathode foil connected to the cathode portion via a first conductive paste; and a cathode lead terminal electrically connected to the cathode portion. The cathode lead terminal has at least one side wall portion facing a side surface of the cathode portion and electrically connected to the cathode foil. This makes it possible to reduce the ESR of the solid electrolytic capacitor.

11 Claims, 7 Drawing Sheets

(51) Int. Cl.

| | |
|---|---|
| *H01G 9/012* | (2006.01) |
| *H01G 9/042* | (2006.01) |
| *H01G 9/045* | (2006.01) |
| *H01G 9/07* | (2006.01) |
| *H01G 9/26* | (2006.01) |

(52) U.S. Cl.
CPC ........... *H01G 9/0425* (2013.01); *H01G 9/045*
(2013.01); *H01G 9/07* (2013.01); *H01G 9/26*
(2013.01)

(56) References Cited

U.S. PATENT DOCUMENTS

| | | | |
|---|---|---|---|
| 2013/0222977 A1* | 8/2013 | Kawahito | ................ H01G 9/08 |
| | | | 361/523 |
| 2019/0244765 A1 | 8/2019 | Harada et al. | |

FOREIGN PATENT DOCUMENTS

| | | | |
|---|---|---|---|
| JP | 2011-035084 A | 2/2011 | |
| JP | 2011-176219 A | 9/2011 | |
| JP | 2013-179143 A | 9/2013 | |
| WO | 2018/074408 A1 | 4/2018 | |

OTHER PUBLICATIONS

CN-115274306-B Machine Translation (Year: 2025).*
International Search Report dated Apr. 25, 2023 issued in International Patent Application No. PCT/JP2023/005889, with English translation.

* cited by examiner

SOLID ELECTROLYTIC CAPACITOR

CROSS REFERENCE TO RELATED APPLICATION

This application is a continuation of International Application No. PCT/JP2023/005889 filed on Feb. 20, 2023, and claims the benefit of priority to Patent Application No. 2022-048601 filed on Mar. 24, 2022 in the Japan Patent Office. The entire contents of these applications are incorporated herein by reference.

TECHNICAL FIELD

The present disclosure relates to a solid electrolytic capacitor.

BACKGROUND

Conventionally, solid electrolytic capacitors that use a solid as an electrolyte are known (for example, Japanese Laid-Open Patent Publication No. 2011-176219). The solid electrolytic capacitor of Japanese Laid-Open Patent Publication No. 2011-176219 includes a capacitor element having a solid electrolyte layer that is a cathode, a metal electrode lead-out member that is connected to the solid electrolyte layer via a conductive paste and contains carbon at its surface, and a cathode lead connected to the electrode lead-out member. The electrode lead-out member is constituted of, for example, an aluminum foil that contains carbon at its surface.

SUMMARY

However, the solid electrolytic capacitor of Japanese Laid-Open Patent Publication No. 2011-176219 tends to have a low capacitance storage efficiency relative to the package (that is, the ratio of the volume of the portion that contributes to capacitance expression to the total volume of the solid electrolytic capacitor) and also have a high ESR value. In view of this situation, an object of the present disclosure is to reduce the ESR of a solid electrolytic capacitor.

One aspect of the present disclosure relates to a solid electrolytic capacitor. The solid electrolytic capacitor includes: a stacked unit constituted by a stack of a plurality of capacitor units each having a capacitor element including an anode portion and a cathode portion, and a cathode foil connected to the cathode portion via a first conductive paste; and a cathode lead terminal electrically connected to the cathode portion, in which the cathode lead terminal has at least one side wall portion facing a side surface of the cathode portion and electrically connected to the cathode foil

Advantageous Effects of the Invention

According to the present disclosure, the ESR of the solid electrolytic capacitor can be reduced.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION

Figure 1:
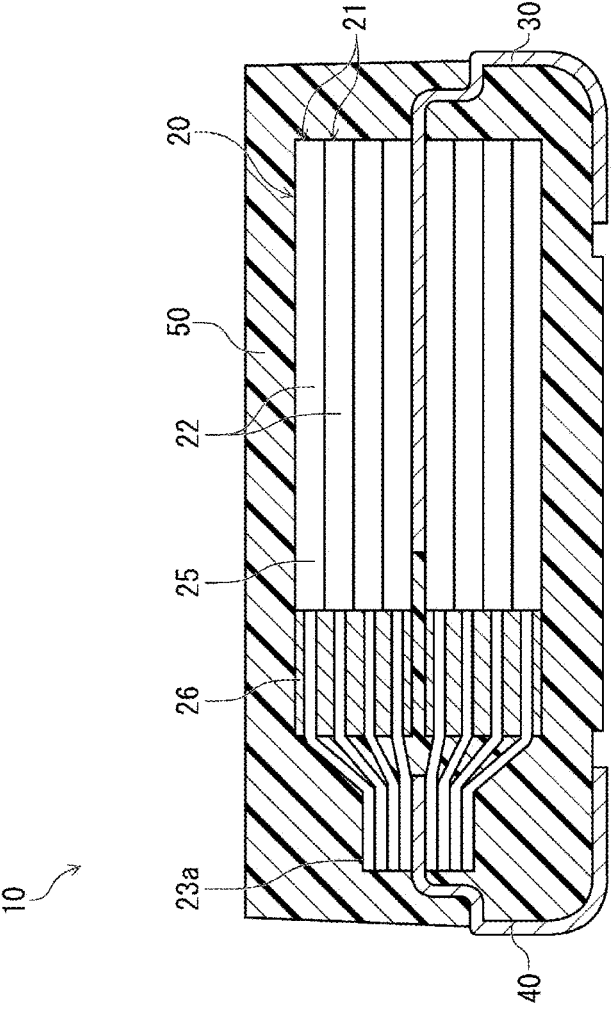
FIG. 1 is a sectional view schematically illustrating a solid electrolytic capacitor of a first embodiment.

Embodiments of a solid electrolytic capacitor according to the present disclosure will be described below with reference to examples. However, the present disclosure is not limited to the examples described below. In the following description, specific numerical values and materials may be given as examples, but other numerical values and materials may be applied as long as effects of the present disclosure are obtained.

The solid electrolytic capacitor according to the present disclosure includes a stacked unit and a cathode lead terminal.

The stacked unit is formed by stacking a plurality of capacitor units. Each capacitor unit has a capacitor element and a cathode foil. The capacitor element includes an anode portion and a cathode portion. An insulating portion may be provided between the anode portion and the cathode portion to electrically insulate them from each other. The insulating portion may be constituted of, for example, an insulating tape or an insulating resin.

The anode portion may be configured to include a part of an anode body (the part on one side of the insulating portion) constituted of a valve action metal of the capacitor element. The cathode portion may have a solid electrolyte layer formed on the surface of a cathode forming portion that is the remaining part of the anode body (the part on the other side of the insulating portion). A carbon layer may or may not be formed on the surface of the solid electrolyte layer. In the solid electrolytic capacitor of the present disclosure, no silver paste layer is formed on the surface of the solid electrolyte layer or the carbon layer. The carbon layer may contain a resin or binder, but the amount thereof is usually small. A dielectric layer is provided between the anode body and the solid electrolyte layer.

Examples of the valve action metal constituting the anode body include aluminum, tantalum, niobium, and titanium. The anode body may be a valve action metal foil or a sintered body of valve action metal particles.

The dielectric layer is formed on at least the surface of the cathode forming portion that is the remaining part of the anode body. The dielectric layer may be constituted of an oxide (for example, aluminum oxide) formed on the surface of the anode body by anodization, a gas phase method such as vapor deposition or atomic layer deposition, or the like.

The solid electrolyte layer is formed on the surface of the dielectric layer. The solid electrolyte layer may include a conductive polymer. The solid electrolyte layer may further include a dopant, as necessary.

As the conductive polymer, a known one used in solid electrolytic capacitors, for example, a π-conjugated conductive polymer or the like can be used. Examples of the conductive polymer include polymers having a basic skeleton of polypyrrole, polythiophene, polyaniline, polyfuran, polyacetylene, polyphenylene, polyphenylenevinylene, polyacene, or polythiophenevinylene. Of these, polymers having a basic skeleton of polypyrrole, polythiophene, or polyaniline are preferred. The above polymers include homopolymers, copolymers of two or more monomers, and derivatives thereof (such as substituted products having substituents). For example, polythiophenes include poly(3, 4-ethylenedioxythiophene) and the like. The conductive polymers may be used alone or in combination of two or more.

As the dopant, for example, at least one selected from the group consisting of low molecular weight anions and poly-anions is used. Examples of the anion include sulfate ions, nitrate ions, phosphate ions, borate ions, organic sulfonate ions, and carboxylate ions, but there is no particular limitation. Examples of the dopant that generates the organic sulfonate ions include benzenesulfonic acid, p-toluenesulfo-nic acid, and naphthalenesulfonic acid. Examples of the polyanions include polymer type polysulfonic acid and polymer type polycarboxylic acid. Examples of the polymer type polysulfonic acid include polyvinylsulfonic acid, poly-styrenesulfonic acid, polyallylsulfonic acid, polyacryl-icsulfonic acid, and polymethacrylicsulfonic acid. Examples of the polymer type polycarboxylic acid include polyacrylic acid and polymethacrylic acid. Other examples of the poly-anions include polyestersulfonic acid, phenolsulfonic acid novolac resin, and the like. However, the polyanions are not limited to these.

The solid electrolyte layer may further include known additives and known conductive materials other than the conductive polymers, as necessary. Examples of such con-ductive materials include at least one selected from the group consisting of conductive inorganic materials such as manganese dioxide, and TCNQ complex salts.

The cathode foil is connected to the cathode portion via a first conductive paste. That is, the cathode foil and the cathode portion are in electrically conduction with each other. The cathode foil may be a sheet-like member con-taining metal. The shape of the cathode foil may be the same as or different from a shape of the cathode portion. The thickness of the cathode foil may be, for example, 15 μm or more and 25 μm or less. The first conductive paste may contain carbon, or may contain carbon and a resin or binder. The carbon may be graphite powder or carbon black as long as it is conductive. The amount of the resin contained in the first conductive paste is usually greater than that of the resin contained in the carbon layer, and the first conductive paste has adhesive properties.

The cathode lead terminal is electrically connected to the cathode portion. The cathode lead terminal may be con-nected to the cathode portion via a second conductive paste. The cathode lead terminal has at least one side wall portion facing a side surface of the cathode portion and electrically connected to the cathode foil. Each side wall portion may be formed by bending a part of a plate-like member constituting the cathode lead terminal. Each side wall portion may face side surfaces of all the cathode portions or may face the side surfaces of some of the cathode portions. Note that the side surface of the cathode portion refers to a surface connecting two main surfaces of the cathode portion. Each side wall portion may be electrically connected to all the cathode foils or may be electrically connected to some of the cathode foils. However, it is preferable that all of the cathode foils are electrically connected to a side wall portion.

Such a side wall portion can reduce the ESR of the solid electrolytic capacitor even when the conductive path between the cathode lead terminal and the cathode portions is shortened, and the first conductive paste contains carbon instead of silver. In addition, as described above, since the silver paste layer is not formed on the surface of the solid electrolyte layer or the carbon layer, the manufacturing cost of the solid electrolytic capacitor can be reduced.

The solid electrolytic capacitor may further include an anode lead terminal electrically connected to the anode portion, and an exterior resin that covers the components such that the cathode lead terminal and the anode lead terminal each have a portion exposed to the outside. The anode lead terminal may be connected to the anode portion by, for example, welding (for example, resistance welding or laser welding).

In each capacitor unit, a pair of cathode foils may be provided to sandwich the capacitor element. In this configu-ration, the number of cathode foils provided in the capacitor unit is twice the number of capacitor elements. Compared to when one cathode foil is provided for each capacitor ele-ment, or when one cathode foil is shared by two capacitor elements, the conductive path to each capacitor element can be enlarged, and thus the ESR of the solid electrolytic capacitor can be further reduced.

The side wall portion may be connected to the cathode foil via the second conductive paste different from the first conductive paste. The first conductive paste may contain carbon. The second conductive paste may contain silver.

The second conductive paste may be in contact with both the main surface and a side surface of the cathode foil. With this configuration, the second conductive paste is in contact with a wide region of the cathode foil, so that the resistance between the side wall portion and the cathode foil and eventually the cathode portion can be reduced, and the ESR of the solid electrolytic capacitor can be further reduced. Note that the side surface of the cathode foil refers to a surface connecting two main surfaces of the cathode foil.

The side wall portion may be connected to the cathode foil by laser welding. With this configuration, the amount of an expensive material (for example, silver) used can be reduced, and thus the manufacturing cost of the solid elec-trolytic capacitor can be reduced.

The cathode portion may have the solid electrolyte layer and a carbon layer provided on the surface of the solid electrolyte layer. The carbon layer may be in contact with the first conductive paste. With this configuration, affinity between the carbon layer and the first conductive paste is high, so that the ESR of the solid electrolytic capacitor can be reduced more than when the first conductive paste is provided on the surface of the solid electrolyte layer. The first conductive paste may contain carbon.

The thickness of the carbon layer may be 3 μm or less. With this configuration, the resistance in the carbon layer can be made extremely small, and the ESR of the solid electrolytic capacitor can be further reduced. Note that a thickness $T1$ of the carbon layer may be greater than 3 μm.

A thickness $T2$ of the first conductive paste may be 40 μm or less. With this configuration, the resistance in the first conductive paste can be made extremely small, and the ESR of the solid electrolytic capacitor can be further reduced. Note that the thickness of the first conductive paste may be greater than 40 μm. The thickness $T2$ may be greater than the thickness $T1$, and for example, the value of $T2/T1$ may be 1 or more and 100 or less, or $T2/T1>1$.

At least one of the cathode foils may be constituted of copper or copper alloy foil. All of the cathode foils may be constituted of copper or copper alloy foil.

At least one of the cathode foils may be constituted of an aluminum foil having a surface layer containing carbon. All of the cathode foils may be constituted of the aluminum foil having the surface layer containing carbon.

The capacitor element may not contain silver. This can reduce the manufacturing cost of the solid electrolytic capacitor.

As described above, according to the present disclosure, the ESR of the solid electrolytic capacitor can be reduced. Furthermore, according to the present disclosure, the manufacturing cost of the solid electrolytic capacitor can be reduced.

Examples of the solid electrolytic capacitor according to the present disclosure will be described in detail below with reference to the drawings. The components described above can be applied to the components of the solid electrolytic capacitor of the examples described below. The components of the solid electrolytic capacitor of the examples described below can be modified based on the above description. Further, matters described below may be applied to the above embodiment. Of the components of the solid electrolytic capacitor of the examples described below, components that are not essential to the solid electrolytic capacitor according to the present disclosure may be omitted. Note that the figures referred to below are schematic and do not accurately reflect shapes or number of actual members. Further, in the following description, terms indicating directions such as "up" and "down" may be used, but these are used for convenience of description and do not limit the scope of the present disclosure in any way.

First Embodiment

A first embodiment of the present disclosure will be described. A solid electrolytic capacitor 10 of the present embodiment is a so-called gull-wing type solid electrolytic capacitor (a type in which each lead terminal extends from a side surface and extends along the lower surface of the exterior resin), but is not limited to this. For example, the solid electrolytic capacitor 10 may be a so-called bottom electrode type solid electrolytic capacitor (a type in which each lead terminal is exposed from the lower surface of the exterior resin), or a so-called end surface current collection type solid electrolytic capacitor (a type in which a lead terminal that collects current from each capacitor element is provided on an end surface of the exterior resin). Further, the solid electrolytic capacitor 10 of the present embodiment has capacitor elements facing the same direction, but is not limited to this, and some capacitor elements may face directions opposite to the remaining capacitor elements. In the latter case, current flowing through some capacitor elements and current flowing through the remaining capacitor elements flow in opposite directions, and magnetic fields of the two currents cancel each other out, and thus the ESL of the solid electrolytic capacitor 10 can be reduced.

As illustrated in FIGS. 1 to 4, the solid electrolytic capacitor 10 of the present embodiment has a double-sided laminated structure (a structure in which capacitor elements are stacked on both sides of each lead terminal). The solid electrolytic capacitor 10 includes a stacked unit 20, a cathode lead terminal 30, an anode lead terminal 40, and an exterior resin 50. The stacked unit 20 is formed by stacking a plurality of capacitor units 21. The laminating direction here is the vertical direction in FIG. 1. The plurality of capacitor units 21 are stacked via a conductive paste (for example, silver paste) not illustrated. Each capacitor unit 21 has one capacitor element 22 and a pair of cathode foils 27.

Figure 2:
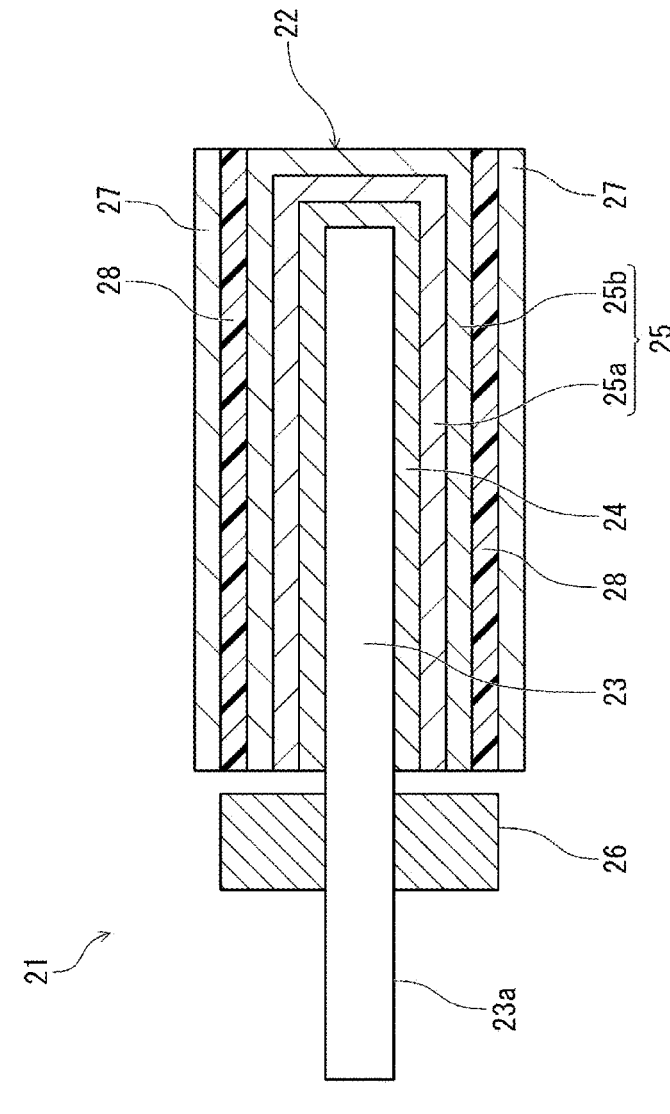
FIG. 2 is a sectional view schematically illustrating a capacitor unit of the first embodiment.
Figure 3:
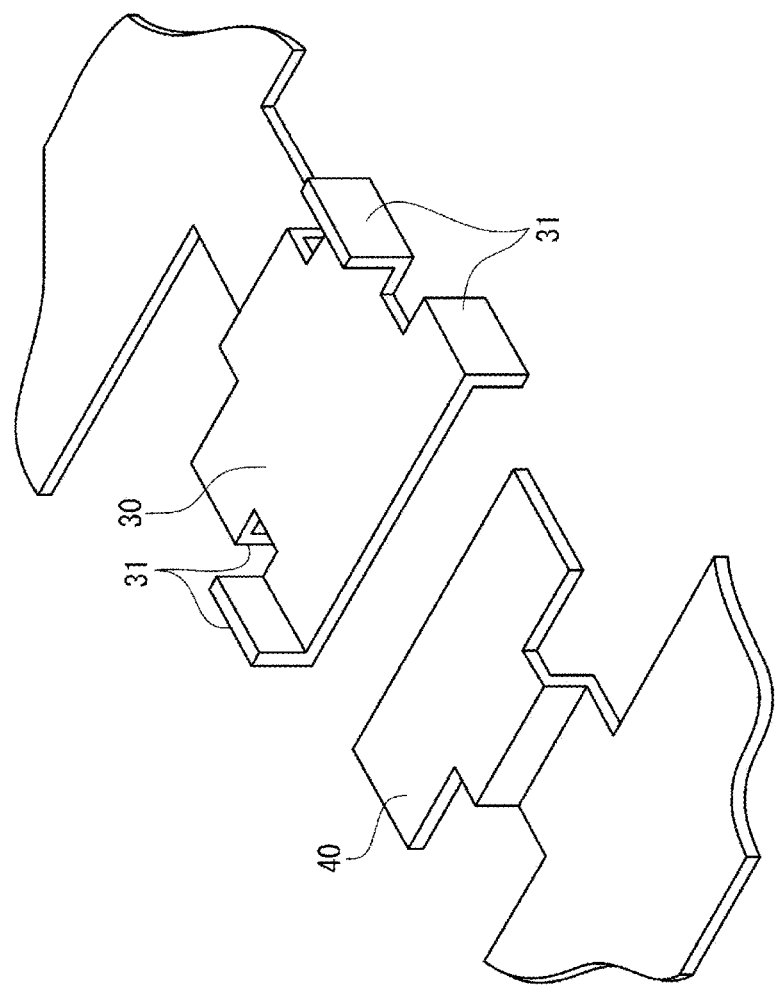
FIG. 3 is a perspective view schematically illustrating lead terminals.
Figure 4:
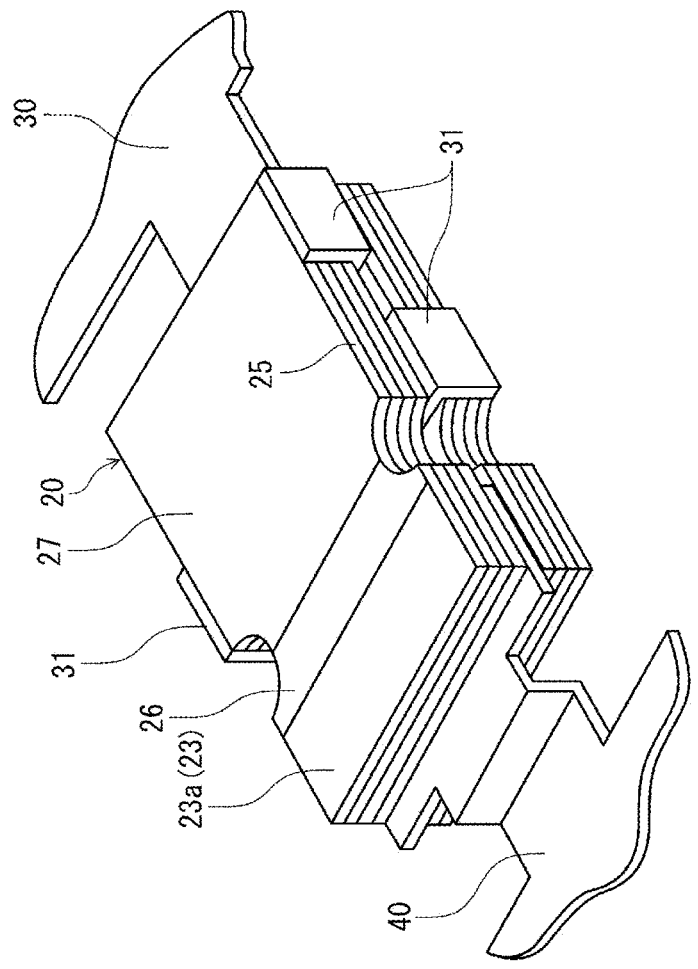
FIG. 4 is a perspective view illustrating a state in which a plurality of capacitor units are stacked on each lead terminal.

As illustrated in FIG. 2, the capacitor element 22 has an anode portion 23a, a cathode portion 25, and an insulating portion 26. The capacitor element 22 does not contain silver. The anode portion 23a is constituted of a part of an anode body 23 constituted of a valve action metal (for example, aluminum). The cathode portion 25 is constituted of a solid electrolyte layer 25a and a carbon layer 25b formed in this order on the surface of the cathode forming portion that is the remaining part of the anode body 23. The carbon layer 25b has a thickness of 3 μm or less, but is not limited to this. The insulating portion 26 is constituted of an insulating tape, and electrically insulates the anode portion 23a and the cathode portion 25. A dielectric layer 24 is provided between the anode body 23 and the solid electrolyte layer 25a.

The pair of cathode foils 27 are arranged to sandwich the capacitor element 22. Each cathode foil 27 is constituted of a copper alloy foil, but is not limited to this. Each cathode foil 27 is connected to the cathode portion 25 via a first conductive paste 28 containing carbon. The shape of the cathode foil 27 is substantially the same as that of the cathode portion 25. The first conductive paste 28 is in contact with the cathode foil 27 and the carbon layer 25b of the cathode portion 25. The thickness of the first conductive paste 28 is 40 μm or less, but is not limited to this.

The cathode lead terminal 30 is electrically connected to the cathode portion 25. The cathode lead terminal 30 is connected to the cathode portion 25 via a conductive paste (not illustrated). The cathode lead terminal 30 has a plurality of (in this example, four) side wall portions 31 that face side surfaces of the cathode portion 25 (or side surfaces of the capacitor units 21) and are electrically connected to the cathode foil 27. The side wall portions 31 are connected to the cathode foil 27 via a second conductive paste (not illustrated) containing silver. The second conductive paste is in contact with both the main surface and the side surface of the cathode foil 27.

The anode lead terminal 40 is electrically connected to the anode portion 23a. The anode lead terminal 40 is connected to the anode portion 23a by, for example, resistance welding.

The exterior resin 50 covers the stacked unit 20, the cathode lead terminal 30, and the anode lead terminal 40 so that the cathode lead terminal 30 and the anode lead terminal 40 each have a portion exposed to the outside. The exterior resin 50 is constituted of an insulating resin material. The exposed portions of the cathode lead terminal 30 and the anode lead terminal 40 constitute external terminals of the solid electrolytic capacitor 10.

Second Embodiment

A second embodiment of the present disclosure will be described. The solid electrolytic capacitor 10 of the present embodiment differs from the first embodiment in terms of basic structure and the number of cathode foils 27 in each capacitor unit 21. The following will mainly describe differences from the first embodiment.

Figure 5:
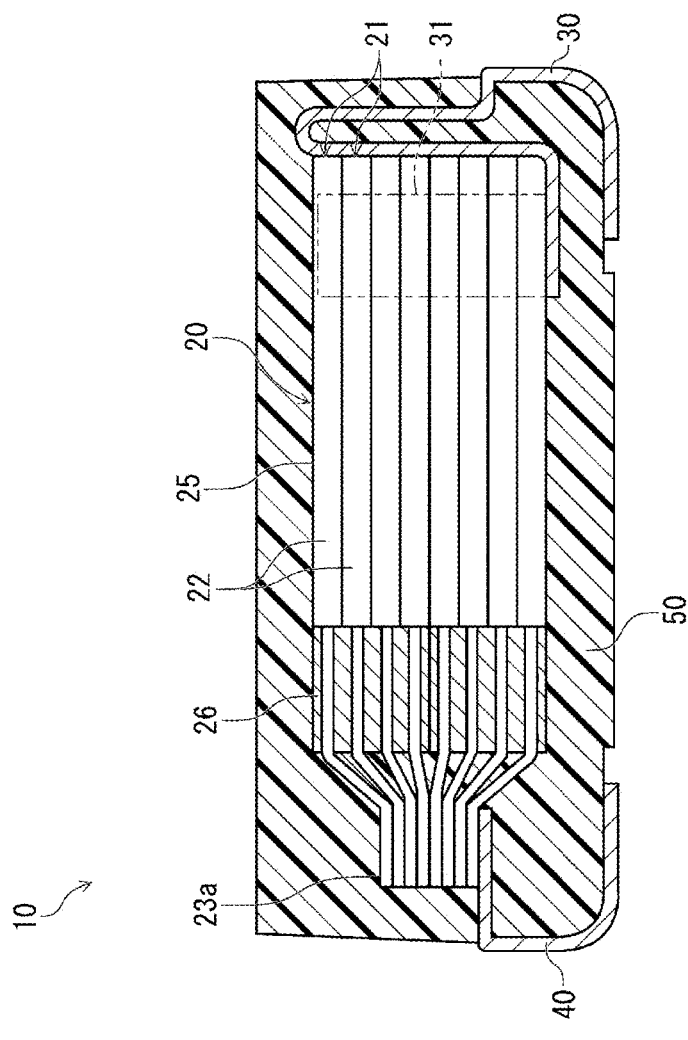
FIG. 5 is a sectional view schematically illustrating a solid electrolytic capacitor of a second embodiment, with a side wall portion indicated by a two-dot chain line.

As illustrated in FIG. 5, the solid electrolytic capacitor 10 of the present embodiment has a single-sided laminated structure (a structure in which the capacitor elements are stacked on one side of each lead terminal).

Figure 6:
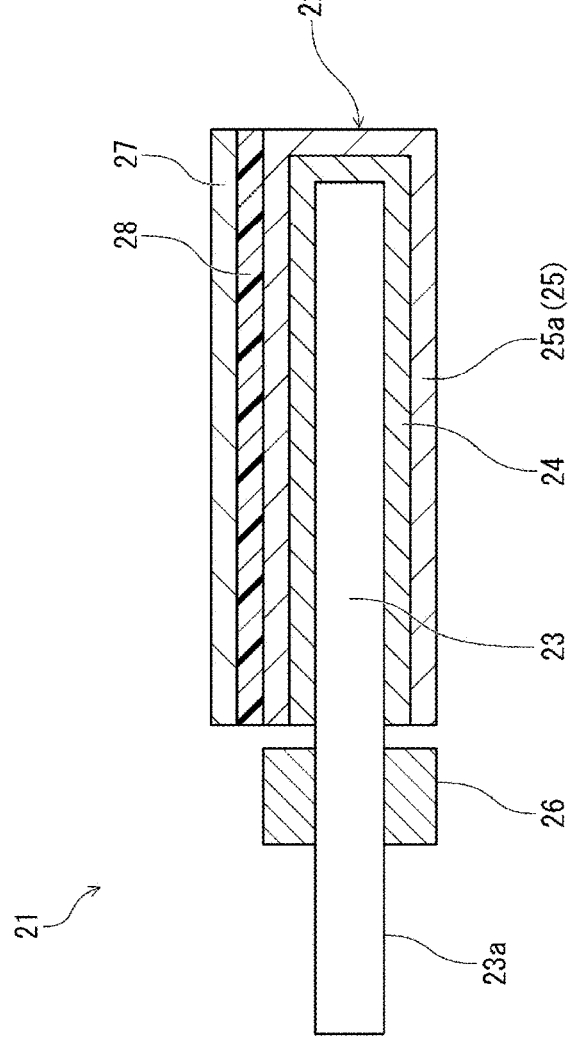
FIG. 6 is a sectional view schematically illustrating a capacitor unit of the second embodiment.

As illustrated in FIG. 6, each capacitor unit 21 has one capacitor element 22 and one cathode foil 27. The capacitor element 22 does not have the carbon layer, and the solid electrolyte layer 25a is in contact with the first conductive paste 28. Each cathode foil 27 is constituted of an aluminum foil having a surface layer containing carbon. Note that in an illustrated example, in each capacitor unit 21, the cathode foil 27 is disposed on the side farther from the cathode lead terminal 30 (the upper side in FIG. 6), but it may also be disposed on the side closer to the cathode lead terminal 30 (the lower side in FIG. 6).

The cathode lead terminal 30 has a pair of side wall portions 31 (one each on front and back sides in FIG. 5). The pair of side wall portions 31 are arranged to sandwich the stacked unit 20 from opposite sides. The length of each side wall portion 31 (the vertical dimension in FIG. 5) may be less than the stacking direction dimension of the stacked unit 20, may be the same as the stacking direction dimension, or may be greater than the stacking direction dimension. Each side wall portion 31 is connected to the cathode foil 27 by laser welding.

Third Embodiment

A third embodiment of the present disclosure will be described. The solid electrolytic capacitor 10 of the present embodiment differs from the first embodiment in terms of basic structure. The following will mainly describe differences from the first embodiment.

Figure 7:
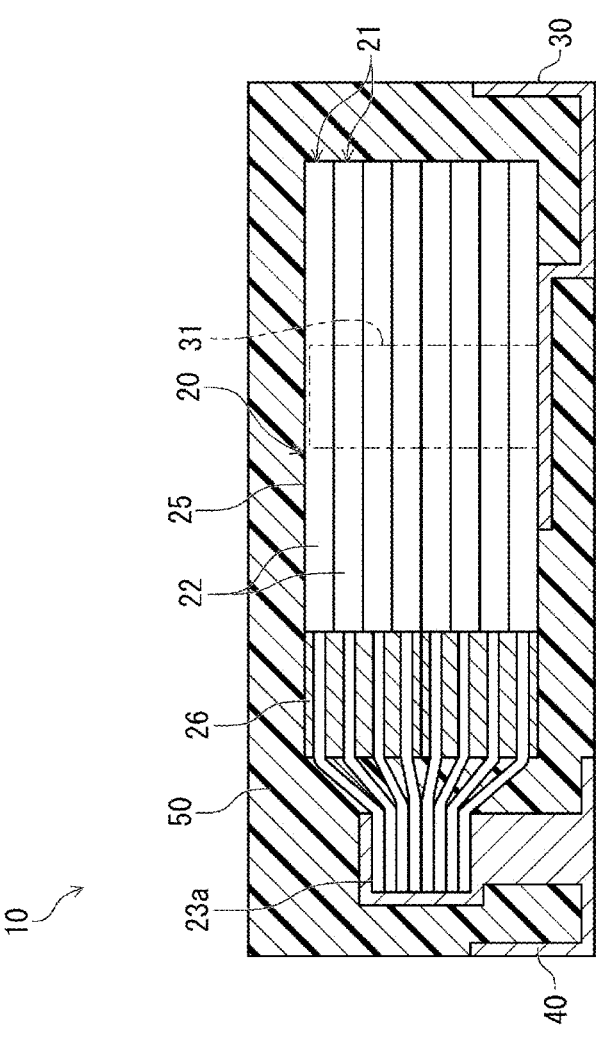
FIG. 7 is a sectional view schematically illustrating a solid electrolytic capacitor of a third embodiment, with a side wall portion indicated by a two-dot chain line.

As illustrated in FIG. 7, the solid electrolytic capacitor 10 of the present embodiment is a bottom electrode type solid electrolytic capacitor (a type in which each lead terminal is exposed from the lower surface of the exterior resin).

The cathode lead terminal 30 has a shape that generally follows the lower surface of the exterior resin 50, and a portion thereof extends along a side surface of the exterior resin 50. The anode lead terminal 40 has a portion disposed to sandwich a plurality of anode portions 23a from above and below, and a portion having a shape that generally follows the lower surface of the exterior resin 50. A portion of the anode lead terminal 40 extends along the side surface of the exterior resin 50.

EXAMPLES

The ESR values of solid electrolytic capacitors 10 according to Examples 1 to 6 and Comparative Example described below were evaluated.

Example 1

A gull-wing type solid electrolytic capacitor 10 with the single-sided laminated structure was evaluated. The capacitor element 22 of each capacitor unit 21 was configured to include the cathode portion 25 constituted of the solid electrolyte layer 25a and the carbon layer 25b provided on the surface thereof. Each capacitor unit 21 was configured to include a pair of cathode foils 27 arranged to sandwich the capacitor element 22 and constituted of a copper foil. The side wall portion 31 was configured to be connected to the cathode foil 27 by laser welding. The ESR of the solid electrolytic capacitor 10 of Example 1 was 2.91 mΩ.

Example 2

A gull-wing type solid electrolytic capacitor 10 with the single-sided laminated structure was evaluated. The capacitor element 22 of each capacitor unit 21 was configured to include the cathode portion 25 constituted of the solid electrolyte layer 25a and the carbon layer 25b provided on the surface thereof. Each capacitor unit 21 was configured to include a pair of cathode foils 27 arranged to sandwich the capacitor element 22 and constituted of a copper foil. The side wall portion 31 was configured to be connected to the cathode foil 27 via silver paste. The ESR of the solid electrolytic capacitor 10 of Example 2 was 2.94 mΩ.

Example 3

A bottom electrode type solid electrolytic capacitor 10 with the single-sided laminated structure was evaluated. The capacitor element 22 of each capacitor unit 21 was configured to include the cathode portion 25 constituted of the solid electrolyte layer 25a and the carbon layer 25b provided on the surface thereof. Each capacitor unit 21 was configured to include a pair of cathode foils 27 arranged to sandwich the capacitor element 22 and constituted of a copper foil. The side wall portion 31 was configured to be connected to the cathode foil 27 via silver paste. The ESR of the solid electrolytic capacitor 10 of Example 3 was 2.07 mΩ.

Example 4

A gull-wing type solid electrolytic capacitor 10 with the double-sided laminated structure was evaluated. The capacitor element 22 of each capacitor unit 21 was configured to include the cathode portion 25 constituted of the solid electrolyte layer 25a and the carbon layer 25b provided on the surface thereof. Each capacitor unit 21 was configured to include a pair of cathode foils 27 arranged to sandwich the capacitor element 22 and constituted of a copper foil. The side wall portion 31 was configured to be connected to the cathode foil 27 via silver paste. The ESR of the solid electrolytic capacitor 10 of Example 4 was 1.74 mΩ.

Example 5

A gull-wing type solid electrolytic capacitor 10 with the double-sided laminated structure was evaluated. The capacitor element 22 of each capacitor unit 21 was configured to include the cathode portion 25 constituted of the solid electrolyte layer 25a and the carbon layer 25b provided on the surface thereof. Each capacitor unit 21 was configured to include one cathode foil 27 disposed on one side of the capacitor element 22 and constituted of a copper foil. The side wall portion 31 was configured to be connected to the cathode foil 27 via silver paste. The ESR of the solid electrolytic capacitor 10 of Example 5 was 1.80 mΩ.

Example 6

A gull-wing type solid electrolytic capacitor 10 with the double-sided laminated structure was evaluated. The capacitor element 22 of each capacitor unit 21 was configured to include the cathode portion 25 constituted of the solid electrolyte layer 25a and the carbon layer 25b provided on the surface thereof. Each capacitor unit 21 was configured to include a pair of cathode foils 27 arranged to sandwich the capacitor element 22 and constituted of an aluminum foil having the surface layer containing carbon. The side wall portion 31 was configured to be connected to the cathode foil 27 via silver paste. The ESR of the solid electrolytic capacitor 10 of Example 6 was 1.95 mΩ.

Comparative Example

A gull-wing type solid electrolytic capacitor with the single-sided laminated structure was evaluated. Each capacitor element was configured to include a cathode layer provided on the surface of the solid electrolyte layer and constituted of the carbon layer and the silver paste layer. Adjacent cathode portions were configured to be connected to each other via a conductive adhesive. The side wall portion was configured to be connected to the cathode portion via silver paste. The ESR of the solid electrolytic capacitor of Comparative Example was 3.15 mΩ.

As described above, the solid electrolytic capacitors 10 of Examples 1 to 6 have a smaller ESR than the solid electrolytic capacitor of Comparative Example. From this, it can be said that the superiority of Examples 1 to 6 is demonstrated.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The present disclosure can be used for the solid electrolytic capacitor.

REFERENCE NUMERALS

10: solid electrolytic capacitor, 20: stacked unit, 21: capacitor unit, 22: capacitor element, 23: anode body, 23*a*: anode portion, 24: dielectric layer, 25: cathode portion, 25*a*: solid electrolyte layer, 25*b*: carbon layer, 26: insulating portion, 27: cathode foil, 28: first conductive paste, 30: cathode lead terminal, 31: side wall portion, 40: anode lead terminal, 50: exterior resin.

What is claimed is:

1. A solid electrolytic capacitor comprising:
a stacked unit constituted by a stack of a plurality of capacitor units each having a capacitor element including an anode portion and a cathode portion, and a cathode foil connected to the cathode portion via a first conductive paste; and
a cathode lead terminal electrically connected to the cathode portion, wherein
the cathode lead terminal has at least one side wall portion facing a side surface of the cathode portion and electrically connected to the cathode foil.

2. The solid electrolytic capacitor according to claim 1, wherein in each of the capacitor units, a pair of the cathode foils are provided to sandwich the capacitor element.

3. The solid electrolytic capacitor according to claim 1, wherein
the side wall portion is connected to the cathode foil via a second conductive paste different from the first conductive paste,
the first conductive paste contains carbon, and
the second conductive paste contains silver.

4. The solid electrolytic capacitor according to claim 3, wherein the second conductive paste is in contact with both a main surface and a side surface of the cathode foil.

5. The solid electrolytic capacitor according to claim 1, wherein the side wall portion is connected to the cathode foil by laser welding.

6. The solid electrolytic capacitor according to claim 1, wherein
the cathode portion has a solid electrolyte layer and a carbon layer provided on a surface of the solid electrolyte layer, and
the carbon layer is in contact with the first conductive paste.

7. The solid electrolytic capacitor according to claim 6, wherein the carbon layer has a thickness of 3 μm or less.

8. The solid electrolytic capacitor according to claim 1, wherein the first conductive paste has a thickness of 40 μm or less.

9. The solid electrolytic capacitor according to claim 1, wherein at least one of the cathode foils is constituted of copper or copper alloy foil.

10. The solid electrolytic capacitor according to claim 1, wherein at least one of the cathode foils is constituted of an aluminum foil having a surface layer containing carbon.

11. The solid electrolytic capacitor according to claim 1, wherein the capacitor element does not contain silver.

* * * * *